(12) United States Patent
Zhao et al.

(10) Patent No.: US 12,454,842 B2
(45) Date of Patent: Oct. 28, 2025

(54) SEISMIC RESILIENT PRECAST CONCRETE FRAME STRUCTURE AND CONSTRUCTION METHOD THEREFOR

(71) Applicants: SOUTH CHINA UNIVERSITY OF TECHNOLOGY, Guangzhou (CN); CHINA CONSTRUCTION FOURTH ENGINEERING DIVISION GREEN BUILDING TECHNOLOGY (GUANGDONG), LTD, Guangdong (CN);
(Continued)

(72) Inventors: Junxian Zhao, Guangzhou (CN); Zhaoxun Yuan, Guangzhou (CN); Xiangkun Yao, Guangzhou (CN); Zhi Luo, Guangzhou (CN); Kezhu Jiang, Guangzhou (CN); Guohui Yuan, Guangzhou (CN); Weijie Chen, Guangzhou (CN); Wei Han, Guangzhou (CN)

(73) Assignees: SOUTH CHINA UNIVERSITY OF TECHNOLOGY, Guangzhou (CN); CHINA CONSTRUCTION FOURTH ENGINEERING DIVISION GREEN BUILDING TECHNOLOGY (GUANGDONG), LTD, Guangdong (CN);
(Continued)

( * ) Notice: Subject to any disclaimer, the term of this patent is extended or adjusted under 35 U.S.C. 154(b) by 0 days.

(21) Appl. No.: 18/870,377

(22) PCT Filed: Mar. 23, 2023

(86) PCT No.: PCT/CN2023/083510
§ 371 (c)(1),
(2) Date: Nov. 27, 2024

(87) PCT Pub. No.: WO2024/119671
PCT Pub. Date: Jun. 13, 2024

(65) Prior Publication Data
US 2025/0163716 A1 May 22, 2025

(30) Foreign Application Priority Data

Dec. 8, 2022 (CN) .......................... 202211573391.7

(51) Int. Cl.
*E04H 9/02* (2006.01)
*E04B 1/19* (2006.01)
(Continued)

(52) U.S. Cl.
CPC ........... *E04H 9/025* (2013.01); *E04B 1/1903* (2013.01); *E04B 1/215* (2013.01); *E04B 1/98* (2013.01);
(Continued)

(58) Field of Classification Search
CPC ........... E04H 9/025; E04H 9/02; E04H 9/021; E04H 9/024; E04B 1/98;
(Continued)

(56) References Cited

U.S. PATENT DOCUMENTS 5,392,580 A * 2/1995 Baumann .................. E04C 5/04
52/646
6,085,471 A * 7/2000 Axon ...................... E01D 19/02
52/167.7
(Continued)

FOREIGN PATENT DOCUMENTS

CN 106320517 1/2017
CN 107905363 4/2018
(Continued)

OTHER PUBLICATIONS

"International Search Report (Form PCT/ISA/210) of PCT/CN2023/083510", mailed on Aug. 23, 2023, with English translation thereof, pp. 1-4.
(Continued)

*Primary Examiner* — Brent W Herring
(74) *Attorney, Agent, or Firm* — JCIPRNET

(57) ABSTRACT

A seismic resilient precast concrete frame structure includes precast solid columns, precast composite beams, T-shaped
(Continued)

shear connectors having notches, and anti-buckling energy-dissipation connecting plates, wherein the precast composite beams are connected to the precast solid columns and each include a precast composite middle beam and precast composite cantilever beams arranged at two sides of each of the precast composite middle beams; tops of the precast composite cantilever beams and the precast composite middle beams are connected by the T-shaped shear connectors having notches, and the notches in the T-shaped shear connectors having notches are located at a neutral bending moment point of the frame structure under the action of a vertical load; and side surfaces of the precast composite cantilever beams and the precast composite middle beams are connected by means of the anti-buckling energy-dissipation connecting plates.

17 Claims, 12 Drawing Sheets

(71) Applicants: CHINA CONSTRUCTION FOURTH ENGINEERING DIVISION CORP. LTD, Guangdong (CN); BEIJING BRACE DAMPING ENGINEERING TECHNOLOGY CO., LTD, Beijing (CN)

(73) Assignees: CHINA CONSTRUCTION FOURTH ENGINEERING DIVISION CORP. LTD, Guangdong (CN); BEIJING BRACE DAMPING ENGINEERING TECHNOLOGY CO., LTD, Beijing (CN)

(51) Int. Cl.
 *E04B 1/21* (2006.01)
 *E04B 1/98* (2006.01)
 *E04B 1/24* (2006.01)

(52) U.S. Cl.
 CPC ............... *E04H 9/02* (2013.01); *E04H 9/021* (2013.01); *E04H 9/024* (2013.01); *E04B 2001/2415* (2013.01); *E04B 2001/2442* (2013.01); *E04B 2001/2457* (2013.01)

(58) Field of Classification Search
 CPC ..... E04B 2001/2457; E04B 2001/2442; E04B 2001/2415; E04B 1/215; E04B 1/1903; E04C 3/205
 See application file for complete search history.

(56) References Cited

U.S. PATENT DOCUMENTS

| | | | | |
|---|---|---|---|---|
| 6,799,400 | B2* | 10/2004 | Chuang | F16F 7/12 188/371 |
| 8,881,491 | B2* | 11/2014 | Christopoulos | E04B 1/98 52/167.6 |
| 2012/0210669 | A1* | 8/2012 | Lee | E04C 5/0645 52/745.19 |
| 2013/0205707 | A1* | 8/2013 | Han | E04B 1/4121 52/699 |
| 2022/0389708 | A1* | 12/2022 | Jiang | E04B 5/38 |
| 2024/0240485 | A1* | 7/2024 | Qian | E04H 9/0215 |

FOREIGN PATENT DOCUMENTS

| | | |
|---|---|---|
| CN | 215858208 | 2/2022 |
| JP | 2014105493 | 6/2014 |
| KR | 20200004087 | 1/2020 |

OTHER PUBLICATIONS

"Written Opinion of the International Searching Authority (Form PCT/ISA/237) of PCT/CN2023/083510", mailed on Aug. 23, 2023, with English translation thereof, pp. 1-8.

* cited by examiner

A

B

C

SEISMIC RESILIENT PRECAST CONCRETE FRAME STRUCTURE AND CONSTRUCTION METHOD THEREFOR

CROSS-REFERENCE TO RELATED APPLICATION

This application is a 371 of international application of PCT application serial no. PCT/CN2023/083510, filed on Mar. 23, 2023 which claims the priority benefit of Chinese application no. 202211573391.7, filed on Dec. 8, 2022. The entirety of each of the above-mentioned patent applications is hereby incorporated by reference herein and made a part of this specification.

TECHNICAL FIELD

The present invention relates to the field of seismic resistance of building structures, and in particular to a seismic resilient precast concrete frame structure with bearing, energy-dissipating and recovery multi-objective cooperation and construction method therefor.

RELATED ART

China is one of the countries with frequent earthquake disasters. Previous earthquake damage investigations have shown that the destruction and collapse of building structures are the root causes of casualties and economic losses. For this reason, the traditional seismic design of buildings has the goal to prevent collapse in order to protect people's lives and property safety. However, the disadvantages of anti-collapse design have been fully exposed in recent earthquakes at home and abroad. Although a large number of buildings have not collapsed, they are faced with a large number of demolition due to serious structural damages, and thus causes high reconstruction costs and slow reconstruction process, which has a great impact on functional recovery in post-earthquake areas. For this reason, the recoverability of structural function has received much attention. The concept of seismic design of buildings has been changed from the anti-collapse design to the recoverable design, which not only focuses on ensuring the structural state during the earthquake, but also considers the structural function recovery after the earthquake. Meanwhile, under the national strategy of "carbon peaking and carbon neutralization", as one of the representatives of green buildings, the prefabricated building has been widely used because of its energy saving and emission reduction, high resource utilization and so on. Therefore, under the background of developing functionally recoverable structures and promoting the prefabricated buildings, the development of seismic resistant structural systems with excellent seismic performance, which may be recovered without repair or with a little repair after earthquake, has become an urgent need in the field of seismic engineering, which is of great significance for promoting the construction of seismic resilient cities and the green transformation and upgrading of economic society in China.

Concrete frame structure has become one of the most studied and applied industrialized structural systems because it meets the requirements of flexibility of building space arrangement and easy standardization of structural members. As shown in FIG. 1, a typical precast concrete frame structure is mainly composed of a prefabricated solid column 1, a prefabricated superposed beam 2 and a prefabricated superposed slab 3. After the above three prefabricated members are hoisted in place, the reinforcing bars in the superposed cast-in-place layers are bound and the formwork is erected. The concrete is poured on the superposed surfaces of the prefabricated beam-column joints, the prefabricated superposed beams and the prefabricated superposed slabs to form a complete frame structure. As shown in FIG. 2, when the frame structure is subjected to seismic action, it forms a beam-end plastic hinge 4 and a column-end plastic hinge 5 mainly by the yield of reinforcement, so as to dissipate seismic energy. Although the above-mentioned anti-collapse design based on ductility may avoid the collapse of the frame structure when the frame structure is subjected to a rare earthquake which is higher than the seismic fortification intensity in this area, i.e., meeting the "no collapse under large earthquakes" in the three-level seismic fortification goal, the structure is seriously damaged and has large residual deformation after the earthquake. Thus, it is difficult to achieve the functional recovery after the earthquake. In view of this, researchers at home and abroad have proposed a recoverable design method based on damage control. According to the frame structures with controlled damages, replaceable energy-dissipating members are disposed at the earthquake-vulnerable parts (such as beam ends) of the structure, and the earthquake damages are transferred to the energy-dissipating members by using the deformation mechanism of specific joints, so as to ensure that the main structure is free from damages or has low damages. After the earthquake, the seismic resilience of the structure is achieved by replacing the energy-dissipating members to restore the use function. Combined with the new seismic design method of buildings, the overall seismic performance and functional recoverability of the precast concrete frame structure can be greatly improved, which will promote its application in the areas with high seismic intensity. However, the existing novel precast concrete frame structures provided with replaceable energy-dissipating members still have the following problems.

(1) Difficulty in Coordinating Multiple Objectives of Bearing, Energy-Dissipating and Recovery Firstly, in view of structural bearing, in order to enable the energy-dissipating members to first enter the energy-dissipating working state so as to transfer the main structural damages thereto, the section where the energy-dissipating members are located tends to be weakened, such as the position of the energy-dissipating members 02 in FIG. 3. However, the weakening of the partial section also causes the structural rigidity to be weakened.

Secondly, from the perspective of structural energy dissipation, the existing novel precast concrete frame structure places the energy-dissipating member at the end of the beam close to the column wall, such as the position of the energy-dissipating member 02 in FIG. 3. However, there is a certain distance from the bending moment zero point 03 of the frame beam in FIG. 4. The energy-dissipating member is required to bear the corresponding vertical internal force and horizontal seismic internal force under the vertical load and horizontal seismic action, see FIG. 4-FIG. 5, generating a coupling effect of two directions of internal force, resulting in that the energy dissipation capacity of the structure depends not only on the horizontal seismic internal force demand, but also on the vertical internal force demand. It is difficult to accurately control the working state according to the magnitude of earthquake action. In addition, the energy-dissipating member must bear both the structural shear force and the structural bending moment, and the coupling effect of shear force and bending moment exists, which causes the problems of uncertainty of the energy-dissipating mechanism of the structure, and the uncontrollable yield time and failure modes.

Finally, from the perspective of structural recovery, because the energy-dissipating member plays a role in both vertical loads and horizontal earthquake, it is a bearing member that dissipates seismic energy and bears vertical internal force, which violates the original principle of only dissipating seismic energy, resulting in the coupling of bearing and energy-dissipating mechanism. However, in the post-earthquake repair stage, after the energy-dissipating members with accumulated equivalent damages are removed, the transmission path of vertical load is cut off, and the structure also loses the vertical self-bearing capacity due to the absence of energy-dissipating members. Thus, a jack 04 as shown in FIG. 6 is required to assist the floor force transmission, which causes greater safety risks and increases the cost and time of structure repair, thus resulting in the mutual constraint of structure bearing, energy-dissipating and recovery mechanism.

In conclusion, although the existing novel precast concrete frame structure adopts different joint configurations and energy-dissipating members, which basically achieves the transfer and replacement of damages, it still cannot fundamentally solve the multi-objective cooperation problem of bearing, energy-dissipating and recovery of frame structure.

(2) Significant Floor Effect and Inadequate Overall Structural Damage Control

The previous seismic damage analysis shows that, for the concrete frame structure, regardless of the prefabricated construction method or the cast-in-place construction method, the floor significantly increases the bending bearing capacity and bending stiffness of the frame beam, which makes the design criteria of "strong column and weak beam" difficult to be realized. On the contrary, it is changed to the yield mechanism of "strong beam and weak column", that is, the plastic hinge 5 at the column end appears before the plastic hinge 4 at the beam end, as shown in FIG. 2. The column ends of the frame joints are hinged before the beam ends, which often results in the formation of weak layers of the structure. This is an important reason for the collapse of the structure under earthquake. At the same time, the existing novel precast concrete frame structure focuses on controlling the damages of the main structure (such as frame beam), ignoring the cracking failure of the floor under the reciprocating earthquake, and has the problem of insufficient damage control of the whole structure. As shown in FIG. 3, when the frame joints rotate around the rotation center 01 under an earthquake, the height of the rotation center is lower than the height of the floor center, and the floor is seriously cracked due to the constraint of the joint rotation, which is not conducive to the post-earthquake repair of the structure.

In conclusion, although the existing novel precast concrete frame structures transfer the seismic damages to the energy-dissipating members via the specific joint deformation mechanism, the problems of "strong beam and weak column" and floor cracking caused by the floor effect cannot be solved fundamentally.

The solution of the above problems has important scientific and practical significance for building a frame structure with seismic resilience, so that its functions may be quickly recovered after earthquake.

SUMMARY OF INVENTION

In order to solve the problems of the existing damage control technology, such as complicated and changeable configurations, serious stiffness weakening, alternating rotation center, significant floor effect, insufficient energy dissipation capacity, and difficult post-earthquake repair, the present invention proposes a seismic resilient precast concrete frame structure with bearing, energy-dissipating and recovery multi-objective cooperation and construction method therefor.

In order to solve the above-mentioned technical problem, the present invention adopts the following technical solutions guided by practical engineering applications.

The present invention provides a seismic resilient precast concrete frame structure with bearing, energy-dissipating and recovery multi-objective cooperation, comprising a prefabricated solid column, a prefabricated superposed beam, a notched T-shaped shear connector and a buckling-restrained and energy-dissipating connecting plate; the prefabricated superposed beam is connected to the prefabricated solid column, and the prefabricated superposed beam comprises a prefabricated superposed intermediate beam and prefabricated superposed cantilever beams disposed at both sides of the prefabricated superposed intermediate beam; tops of the prefabricated superposed cantilever beam and the prefabricated superposed intermediate beam are connected by the notched T-shaped shear connector; side faces of the prefabricated superposed cantilever beam and the prefabricated superposed intermediate beam are connected by the buckling-restrained and energy-dissipating connecting plate, wherein a length-width ratio of the notched T-shaped shear connector is less than the length-width ratio of the buckling-restrained and energy-dissipating connecting plate, and a notch in the notched T-shaped shear connector is located at a bending moment zero point under a vertical load of a frame structure.

Further, the seismic resilient precast concrete frame structure with bearing, energy-dissipating and recovery multi-objective cooperation further comprises a shear stud welded to a web of the notched T-shaped shear connector. The technical effect of the technical solution is as follows. The shear stud effectively ensures the joint work of notched T-shaped shear connector and concrete, and has excellent shear redistribution ability.

Further, the seismic resilient precast concrete frame structure with bearing, energy-dissipating and recovery multi-objective cooperation further comprises a first steel plate, a second steel plate, a first short reinforcing bar and a second short reinforcing bar; the first steel plate is welded to a flange edge of a cantilever section side of the notched T-shaped shear connector; the second steel plate is welded to a flange edge of a middle section side of the notched T-shaped shear connector; the first short reinforcing bar is welded to a surface of the first steel plate; and the second short reinforcing bar is welded to a surface of the second steel plate.

Further, the seismic resilient precast concrete frame structure with bearing, energy-dissipating and recovery multi-objective cooperation further comprises a first box-type connector, a second box-type connector, a first U-shaped stirrup, a second U-shaped stirrup, a first thin-walled circular steel pipe, a second thin-walled circular steel pipe and a second integral closed stirrup; the first thin-walled circular steel pipe is welded to reserved bolt holes of the first box-type connector; and the second thin-walled circular steel pipe is welded to reserved bolt holes of the second box-type connector.

A bottom surface of the web of the notched T-shaped shear connector is welded to upper surfaces of top plates of the first box-type connector and the second box-type connector; the first U-shaped stirrup is welded to the upper surface of the top plate of the first box-type connector; the second U-shaped stirrup is welded to the upper surface of the top plate of the second box-type connector; a lower longitudinal bar in the prefabricated superposed cantilever beam is welded to the upper surface of the bottom plate of the first box-type connector; a lower longitudinal bar in the prefabricated superposed intermediate beam is welded to the upper surface of the bottom plate of the second box-type connector; a middle waist bar in the prefabricated superposed cantilever beam is welded to the upper surface of the top plate of the first box-type connector; the middle waist bar in the prefabricated superposed intermediate beam is welded to the upper surface of the top plate of the second box-type connector; and the second integral closed stirrup is bound with the lower longitudinal bars and the middle waist bars of the prefabricated superposed cantilever beam and of the prefabricated superposed intermediate beam.

The technical effect of the technical solution is as follows. The notched T-shaped shear connector and the box-type connector are welded together as an integral to facilitate the accurate positioning of the steel member in the frame beam template. The arrangement of U-shaped stirrups may avoid the installation blocking problem of box-type connectors to common stirrups, and prevent the shear failure of concrete due to the lack of stirrups in this area. When the buckling-restrained and energy-dissipating connecting plate enters the energy-dissipating working state, a large axial tensile-compression force is generated. The box-type connector is welded to the lower longitudinal bar and the middle waist bar in the frame beam, respectively, so as to directly transmit the axial tensile-compression force to the longitudinal bar in the frame beam and avoid local damage of the concrete caused by indirect transmission of the concrete.

Further, the prefabricated superposed cantilever beam and the prefabricated superposed intermediate beam are completely disconnected, with a certain horizontal gap between them, and a reliable connection is achieved by the notched T-shaped shear connector. The technical effect of the technical solution is as follows. A certain horizontal gap is reserved to prevent the bottoms of the prefabricated superposed cantilever beam and the prefabricated superposed intermediate beam from colliding when the members rotate relative to each other. The use of notched T-shaped shear connectors may effectively transfer the vertical shear force of the structure under various conditions, and also make the rotation center move further up to the same height as the floor center, significantly reducing the floor effect.

Further, the seismic resilient precast concrete frame structure with bearing, energy-dissipating and recovery multi-objective cooperation further comprises split bolts; and the buckling-restrained and energy-dissipating connecting plate is bolted to side faces of the first box-type connector and of the second box-type connector by the split bolts. The technical effect of the technical solution is as follows. The buckling-restrained and energy-dissipating connecting plates are arranged on the outer side face of the frame beam by the split bolts, which not only facilitates the arrangement of the walls and doors and windows at the lower part of the frame beam, but also facilitates the disassembly and replacement after the earthquake, so as to achieve the coordination between the recoverable functional structure and the building service functions. The center of rotation is always fixed to the center of the floor due to the lower stiffness of the buckling-restrained and energy-dissipating connecting plate compared to the notched T-shear connector.

Further, the seismic resilient precast concrete frame structure with bearing, energy-dissipating and recovery multi-objective cooperation further comprises a first integral closed stirrup bound with an upper reserved longitudinal bar of the prefabricated solid column (the first layer of prefabricated solid columns is made of high-strength reinforcing bars HRB600).

Further, the seismic resilient precast concrete frame structure with bearing, energy-dissipating and recovery multi-objective cooperation further comprises a prefabricated superimposed slab with partial extending bar mounted on the prefabricated superimposed cantilever beam and the prefabricated superimposed intermediate beam.

Further, the seismic resilient precast concrete frame structure with bearing, energy-dissipating and recovery multi-objective cooperation further comprises a upper longitudinal bar of the prefabricated superposed cantilever beam, an upper longitudinal bar of the prefabricated superposed intermediate beam, a first mechanical connecting sleeve and a second mechanical connecting sleeve; the first mechanical connecting sleeve is completely screwed into the upper longitudinal bar of the prefabricated superposed cantilever beam; the second mechanical connecting sleeve is completely screwed into the upper longitudinal bar of the prefabricated superposed intermediate beam; the first mechanical connecting sleeve and the second mechanical connecting sleeve are reversely screwed into the first short reinforcing bar and the second short reinforcing bar, respectively; and the second integral closed stirrup is respectively bound with the upper longitudinal bar of the prefabricated superposed cantilever beam and the upper longitudinal bar of the prefabricated superposed intermediate beam. The technical effect of the technical solution is as follows. Under the condition of ensuring the continuous force transmission of the upper longitudinal bar of the frame beam, the site welding operation of the upper longitudinal bars of the prefabricated superposed cantilever beam and of the prefabricated superposed intermediate beam with the notched T-shaped shear connector is avoided by the conversion of the mechanical connecting sleeves, short reinforcing bars and rectangular steel plates, and the quality and speed of the site construction are ensured and accelerated.

Further, the seismic resilient precast concrete frame structure with bearing, energy-dissipating and recovery multi-objective cooperation further comprises a steel mesh on the top of the prefabricated superimposed slab with partial extending bar; the steel mesh on a top of the prefabricated superimposed slab with partial extending bar is disposed on the prefabricated superimposed slab with partial extending bar; an end of the steel mesh on the top of the prefabricated superimposed slab with partial extending bar abuts against a upper surface of the flange of the notched T-shaped shear connector; the prefabricated solid column (the first layer of prefabricated solid columns are made of high-strength reinforced steel HRB600) are integrated with the prefabricated superposed cantilever beam, the prefabricated superposed intermediate beam and the prefabricated superposed slab with partial extending bar by post-pouring concrete. The technical effect of the technical solution is as follows. Compared with "dry connection", the joint strength and overall performance of the structure formed by post-cast concrete (i.e. wet connection) are better. The first layer of prefabricated solid columns is made of high-strength reinforcing bars HRB600 to ensure the elasticity of column foot reinforcing bars under large or even super large earthquakes and avoid the formation of plastic hinge in the column foot area, so as to give full play to the energy dissipation mechanism of suspension rotation of frame structure and realize the seismic resilience of structure. Because the gap area of the frame beam (the notch of T-shaped shear connector) is close to the beam end, it is mainly subjected to negative bending moment. In the gap area, the prefabricated superimposed slab with partial extending bar may not only prevent the reinforcing bar at the bottom of the plate from colliding with the web of the notched T-shaped shear connector, but also avoid affecting the seismic bending capacity of the structure.

According to the present invention, a seismic resilient precast concrete frame structure with bearing, energy-dissipating and recovery multi-objective cooperation is proposed. The construction method thereof comprises the steps of:

I. Factory Processing of Steel Skeletons
  (1) welding a shear stud to a web of a notched T-shaped shear connector;
  (2) welding a first steel plate to a flange edge of a cantilever section side of the notched T-shaped shear connector; welding a second steel plate to a flange edge of a middle section side of the notched T-shaped shear connector;
  (3) welding a first short reinforcing bar to a surface of the first steel plate; welding a second short reinforcing bar to a surface of the second steel plate;
  (4) welding the first thin-walled circular steel pipe to reserved bolt holes of the first box-type connector; welding the second thin-walled circular steel pipe to reserved bolt holes of the second box-type connector;
  (5) passing a certain number of second integral closed stirrups into the notched T-shaped shear connector;
  (6) welding a bottom surface of a web of the notched T-shaped shear connector to upper surfaces of top plates of the first box-type connector and of the second box-type connector;
  (7) welding a first U-shaped stirrup to the upper surface of the top plate of the first box-type connector; welding a second U-shaped stirrup to the upper surface of the top plate of the second box-type connector;
  (8) passing a certain number of second integral closed stirrups into a lower longitudinal bar in the prefabricated superposed cantilever beam; passing a certain number of second integral closed stirrups into a lower longitudinal bar in a prefabricated superposed intermediate beam;
  (9) welding the lower longitudinal bar in the prefabricated superposed cantilever beam to the upper surface of the bottom plate of the first box-type connector; welding the lower longitudinal bar in the prefabricated superposed intermediate beam to the upper surface of the bottom plate of the second box-type connector;
  (10) welding a middle waist bar in the prefabricated superposed cantilever beam to the upper surface of the top plate of the first box-type connector; welding a middle waist bar in the prefabricated superposed intermediate beam to the upper surface of the top plate of the second box-type connector;
  (11) adjusting a spacing of all the second integral closed stirrups and binding all the second integral closed stirrups with the lower longitudinal bar and the middle waist bar of the prefabricated superposed cantilever beam and the prefabricated superposed intermediate beam, and thus completing processing of pre-embedded steel members;

II. Factory Fabrication of Precast Concrete Members
  (1) erecting a template, and accurately placing the processed steel skeleton in step I into the template;
  (2) pouring concrete in the template and performing conventional treatments such as maintenance;
  (3) mounting a buckling-restrained and energy-dissipating connecting plate on side faces of the first box-type connector and the second box-type connector by the split bolts, and thus completing the fabrication of the prefabricated superposed beam (the prefabricated superposed cantilever beam+the prefabricated superposed intermediate beam);
  (4) screwing a first mechanical connecting sleeve completely into the upper longitudinal bar of the prefabricated superposed cantilever beam; screwing a second mechanical connecting sleeve completely into the upper longitudinal bar of the prefabricated superposed intermediate beam;
  (5) making a prefabricated solid column, wherein the first layer of the prefabricated solid column is made of high-strength reinforcing bars HRB600;
  (6) making a prefabricated superimposed slab with partial extending bar and a steel mesh on a top of prefabricated superimposed slab with partial extending bar, wherein an overhanging plate bottom reinforcing bar is not provided at a local position corresponding to the notched T-shaped shear connector;

III. On-Site Installation of Precast Concrete Members
  (1) hoisting the prefabricated solid column to a painted positioning line;
  (2) providing a beam bottom temporary support, and hoisting the prefabricated superposed beam (a prefabricated superposed cantilever beam+a prefabricated superposed intermediate beam) to the painted positioning line;
  (3) passing a certain number of first integral closed stirrups into an upper reserved longitudinal bar of the prefabricated solid column and connecting first integral closed stirrups to the prefabricated solid column by binding;
  (4) providing a plate bottom temporary support, and hoisting the prefabricated superimposed slab with partial extending bar to the painted positioning line;
  (5) reversely screwing the first mechanical connecting sleeve into the first short reinforcing bar; binding the upper longitudinal bar of the prefabricated superposed cantilever beam with the second integral closed stirrup of the prefabricated superposed cantilever beam;
  (6) reversely screwing the second mechanical connecting sleeve into the second short reinforcing bar; binding the upper longitudinal bar of the prefabricated superposed intermediate beam with the second integral closed stirrup of the prefabricated superposed intermediate beam;
  (7) arranging the steel mesh on the top of the prefabricated superimposed slab with partial extending bar, the end of the steel mesh on the top of the prefabricated superimposed slab with partial extending bar abuts against the upper surface of the flange of the notched T-shaped shear connector;
  (8) erecting a template of the superimposed cast-in-place layers, and pouring concrete and performing maintenance and other conventional treatments on a superimposed surface of a prefabricated beam-column joint, a prefabricated superposed beam (a prefabricated superposed cantilever beam+prefabricated superimposed intermediate beam) and a prefabricated superimposed slab with partial extending bar;
  (9) repeating steps (1)-(8), successively performing construction and installation of each layer from the bottom to the top, and finally completing the seismic resilient precast concrete frame structure with bearing, energy-dissipating and recovery multi-objective cooperation proposed by the present invention.

Compared to the prior art, the advantageous effects of the present invention are as follows. Under the condition of clarifying the seismic mechanism of bearing, energy-dissipating and recovery cooperative work, the seismic resilient precast concrete frame structure with bearing, energy-dissipating and recovery multi-objective cooperation proposed by the present invention has the advantages of simple construction and installation, weak floor effect, controllable damage of members, sufficient energy dissipation capacity, high efficiency of post-earthquake repair and significant economic benefits. It is suitable for practical civil engineering applications. The advantages of the present invention are embodied in at least the following aspects.

(1) All the welded joints and bolted joints in the structure are completed in the prefabrication factory. Only the mechanical connecting sleeves of the upper longitudinal bars of the prefabricated superposed beam (prefabricated superposed cantilever beam+prefabricated superposed intermediate beam) is required to be screwed into the short reinforcing bars in the field, which not only ensures the quality of the connection but also accelerates the construction efficiency. The buckling-restrained and energy-dissipating connecting plates are arranged on the outer side of the frame beam by using the split bolts, which may effectively solve the effect of the arrangement of energy-dissipating members on the arrangement of walls, doors and windows in the lower part of the frame beam, and realize the coordination between the recoverable functional structure and the building use function.

(2) The vertical internal force and horizontal seismic internal force may be decoupled by placing the gap of the frame beam (notch of T-shaped shear connector) at the bending moment zero point under the vertical load of the frame structure. The notched T-shaped shear connector is a steel member with a small length-width ratio, and the buckling-restrained and energy-dissipating connecting plate is a steel member with a large length-width ratio. The difference in shear stiffness between the two enables the gap shear force to be borne by the notched T-shaped shear connector, thus realizing the decoupling of shear force and bending moment of the buckling-restrained and energy-dissipating connecting plate. The two kinds of decoupling make the buckling-restrained energy-dissipating connecting plate focus on the axial tensile-compression yield energy-dissipating, and do not need to act as the bearing member of vertical internal force, which greatly improves the energy-dissipating capacity of the structure.

(3) When the structure rotates under the action of the reciprocating earthquake, the notch area of the T-shaped shear connector acts as a fixed rotation center, which has the same height as that of the floor center. This is beneficial to reduce the restraint effect of the floor and the post-earthquake cracking and improve the repairability of the floor. In addition, the moment arm of the buckling-restrained energy-dissipating connecting plate is further increased due to the upward movement of the rotation center of the joint, which may better ensure that the structural stiffness is not lost.

(4) In the post-earthquake repair stage, because the gap of the frame beam (the notch of the T-shaped shear connector) is placed at the moment zero point under the vertical load of the frame structure after the removal of the buckling-restrained energy-dissipating connecting plate, the structure does not need to use the buckling-restrained energy-dissipating connecting plate to transmit the internal force of the bending moment, but only relies on the notched T-shaped shear connector to transmit the vertical shear force, without the need for an additional jack to assist the floor force transmission, which improves the post-earthquake recovery speed and reduces the repair costs. The economic benefits are very significant.

(5) In the structural design, by changing the length and cross-sectional area of the buckling-restrained and energy-dissipating connecting plate, the yield moment of the frame joints with "equal stiffness and unequal strength" may be adjusted, which is helpful to realize the energy dissipation of the joints in each layer of the structure and reduce the internal force demand of the beam end, the column end and the column foot, and then to realize the overall damage optimization of the structure with "strong column and weak beam" mechanism. In addition, the first-layer prefabricated solid columns adopts high-strength reinforcing bars, which may ensure the elasticity of column foot reinforcing bars under large earthquakes and even super large earthquakes, avoid the formation of plastic hinge in the column foot area, and give full play to the energy dissipation mechanism of suspension rotation, so as to achieve low damages and functional recovery of the overall structure level.

BRIEF DESCRIPTION OF DRAWINGS

In order to more clearly state the technical solutions of the detailed description of the invention, the drawings required in the detailed description are briefly described below. For comparison, the figures in the prior art is also included in the drawings. It will be apparent that the accompanying drawings in the following description are only one implementation of the invention, and that other drawings may be obtained from the accompanying drawings by those skilled in the art without any creative efforts.

DESCRIPTION OF EMBODIMENTS

Figure 1:
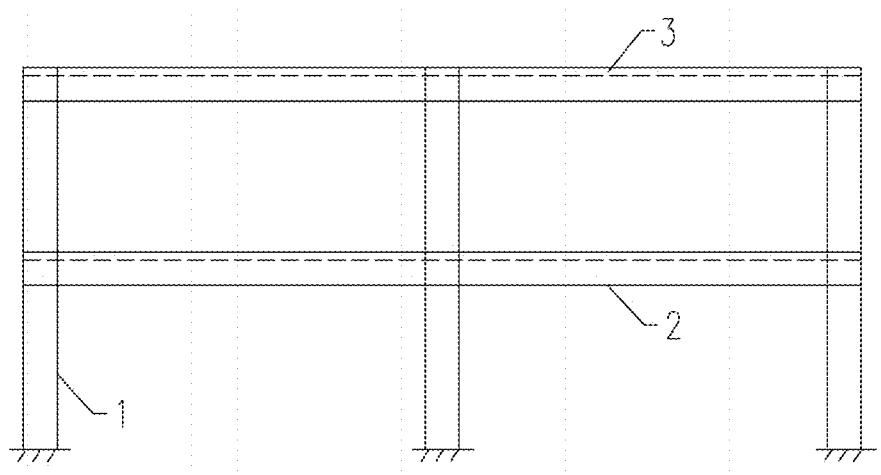
FIG. 1 is a schematic view of a typical precast concrete frame structure.
Figure 2:
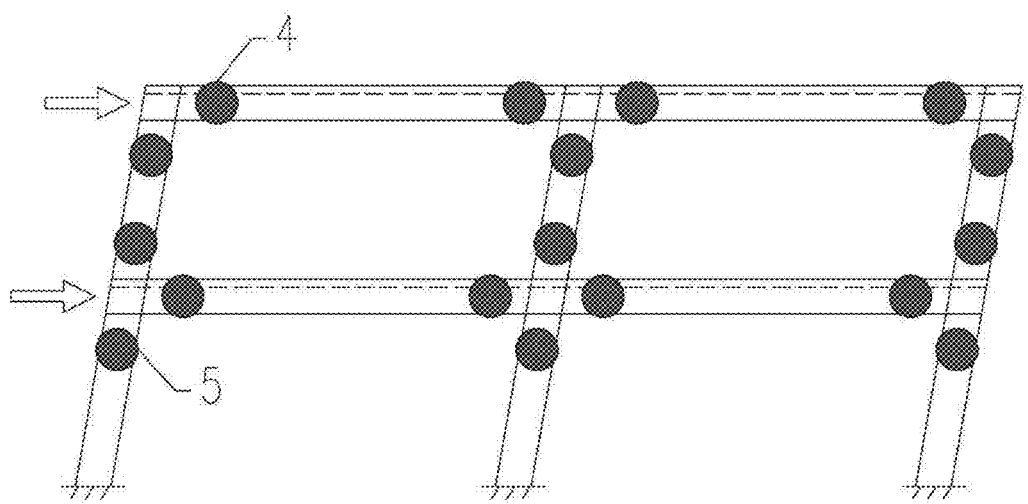
FIG. 2 is a schematic view of a conventional energy dissipating manner of the frame structure shown in FIG. 1.
Figure 3:
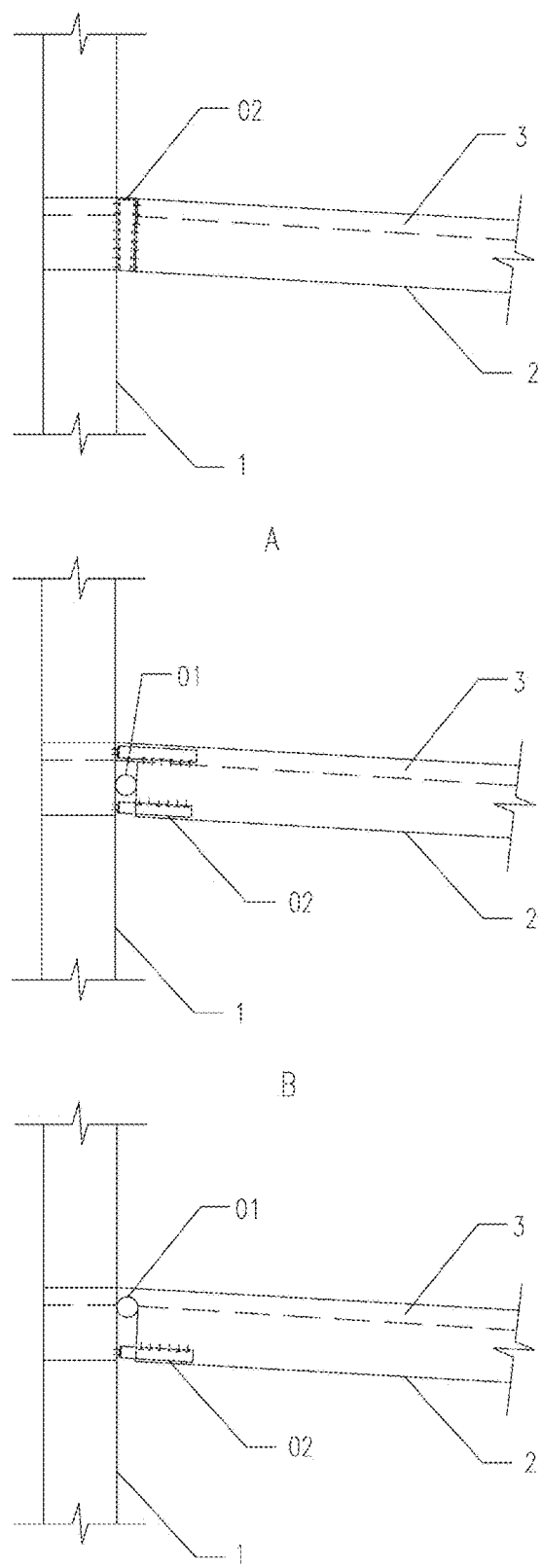
FIG. 3 is a schematic view of the deformation of a precast concrete frame structure provided with replaceable energy-dissipating members.
Figure 4:
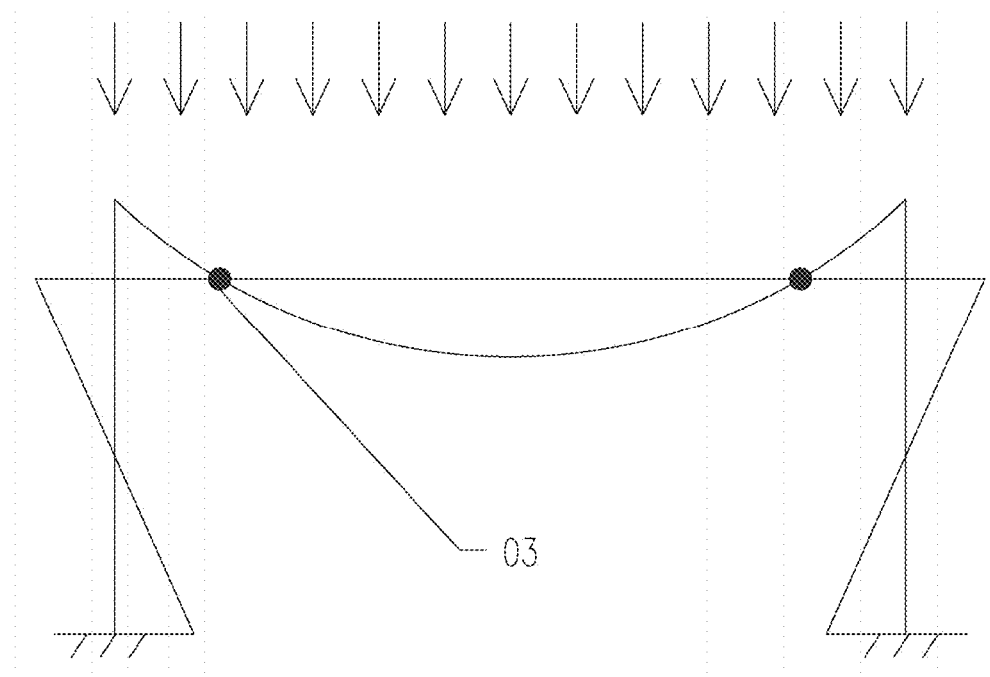
FIG. 4 is a diagram of an internal bending moment of the frame structure of FIG. 3 under a vertical load.
Figure 5:
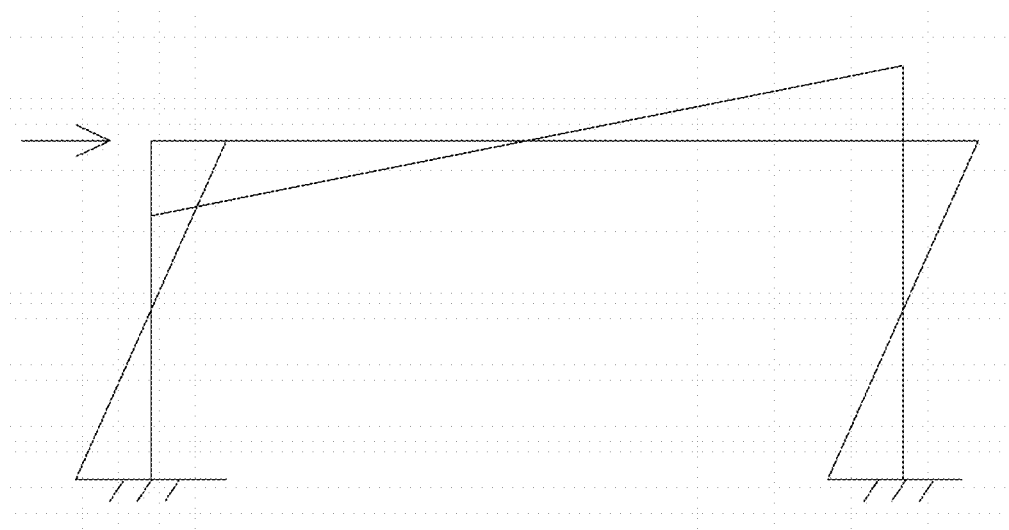
FIG. 5 is a diagram of an internal bending moment of the frame structure of FIG. 3 under a horizontal earthquake.
Figure 6:
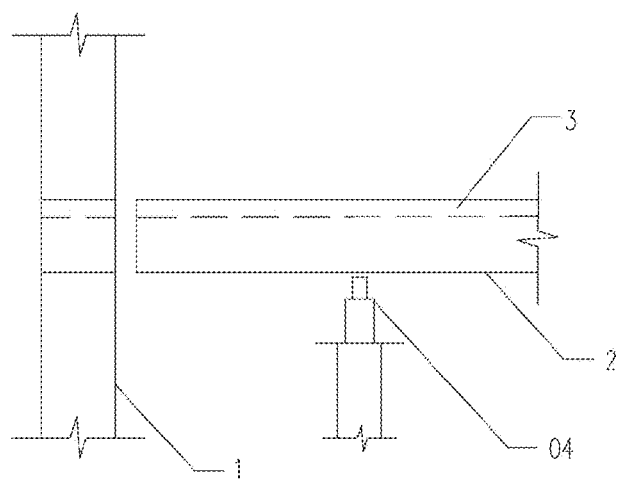
FIG. 6 is a schematic view of a post-earthquake repair stage of the frame structure of FIG. 3.
Figure 6:
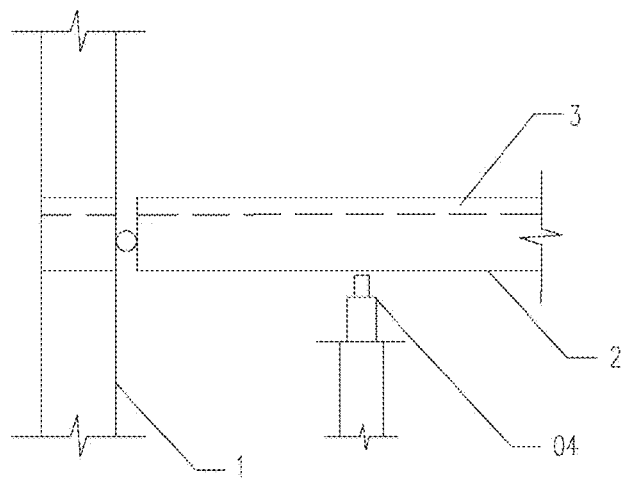
Figure 6:
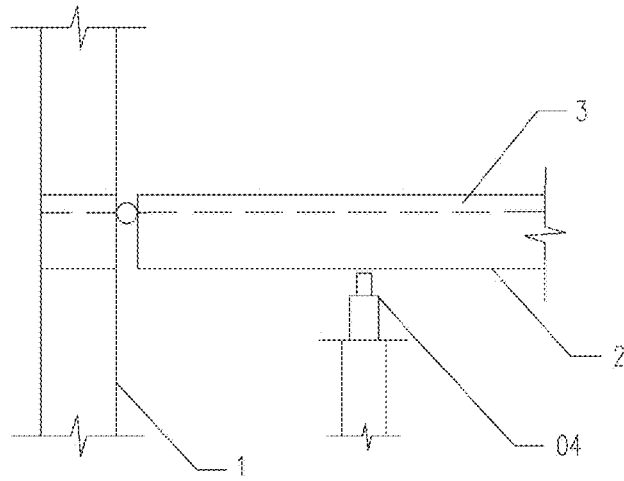

The technical solutions in the invention will be described clearly and completely in conjunction with the accompanying drawings. Obviously, the described embodiment is one of the embodiments of the application, rather than all of the embodiments. Based on the embodiments in the invention, all other embodiments obtained by a person skilled in the art without involving any creative effort are within the scope of protection of the invention.

In the description of the present invention, it should be understood that the directional or positional relationships indicated by the terms "center", "up", "down", "left", "right", "vertical", "horizontal", "inner", "outer" and the like are based on the directional or positional relationships shown in the drawings. It is merely for the purpose of describing the present application and simplifying the description, and is not intended to indicate or imply that a particular orientation, configuration and operation of the referenced device or element is required and should not be construed as limiting the scope of the present invention. Furthermore, the terms "first", "second", "third", and the like are used solely for descriptive purposes and are not to be construed as indicating or implying relative importance.

In the description of the invention, it should be understood that the terms "mounted", "connected", or "connecting" are to be broadly construed as being, for example, fixed connection, removable connection, or integrate connection, unless specifically stated and defined otherwise. They may be mechanical connection or electrical connection. Also, they may be direct or indirect connection through an intermediary, and may be communication internal to two elements. The specific meaning of the above terms in this invention will be understood in specific circumstances by those of ordinary skill in the art.

The present invention provides a seismic resilient precast concrete frame structure, including a prefabricated solid column 1, a prefabricated superposed beam 2, a notched T-shaped shear connector 704 and a buckling-restrained and energy-dissipating connecting plate 719. The prefabricated superposed beam 2 is connected to the prefabricated solid column 1, and the prefabricated superposed beam 2 includes a prefabricated superposed intermediate beam 701 and prefabricated superposed cantilever beams 700 disposed at both sides of the prefabricated superposed intermediate beam 701. The tops of the prefabricated superposed cantilever beam 700 and of the prefabricated superposed intermediate beam 701 are connected by the notched T-shaped shear connector 704. The side faces of the prefabricated superposed cantilever beam 700 and of the prefabricated superposed intermediate beam 701 are connected by the buckling-restrained and energy-dissipating connecting plate 719, wherein the length-width ratio of the notched T-shaped shear connector 704 is less than the length-width ratio of the buckling-restrained and energy-dissipating connecting plate 719, and the notch in the notched T-shaped shear connector 704 is located at a bending moment zero point under a vertical load of a frame structure.

The embodiments of the present invention provide a seismic resilient precast concrete frame structure with bearing, energy-dissipating and recovery multi-objective cooperation. Correspondingly, a construction method thereof is also provided, which includes three steps, namely, factory processing of a steel skeleton, factory prefabrication of precast concrete members and on-site installation of precast concrete members. The steps of the construction method are described below.

I. Factory Processing of Steel Skeletons

As shown in FIG. 8 to FIG. 14, a prefabricated superposed beam 2 includes a prefabricated superposed intermediate beam 701 and prefabricated superposed cantilever beams 700 disposed on both sides of the prefabricated superposed intermediate beam 701. Specifically, the followings are based on the construction sequence: welding a shear stud 705 to a web of a notched T-shaped shear connector 704; welding a first steel plate 706 to a flange edge of a cantilever section side of the notched T-shaped shear connector 704; welding a second steel plate 707 to a flange edge of a middle section side of the notched T-shaped shear connector 704; welding a first short reinforcing bar 708 to the surface of the first steel plate 706; welding a second short reinforcing bar 709 to the surface of the second steel plate 707; welding the first thin-walled circular steel pipe 714 to reserved bolt holes of the first box-type connector 712; welding the second thin-walled circular steel pipe 715 to reserved bolt holes of the second box-type connector 713; passing a certain number of second integral closed stirrups 718 into the notched T-shaped shear connector 704; welding the bottom surface of the web of the notched T-shaped shear connector 704 to the upper surfaces of the top plates of the first box-type connector 712 and of the second box-type connector 713; welding a first U-shaped stirrup 716 to the upper surface of the top plate of the first box-type connector 712; welding a second U-shaped stirrup 717 to the upper surface of the top plate of the second box-type connector 713; passing a certain number of second integral closed stirrups 718 into a lower longitudinal bar in the prefabricated superposed cantilever beam 700; passing a certain number of second integral closed stirrups 718 into a lower longitudinal bar in a prefabricated superposed intermediate beam 701; welding the lower longitudinal bar in the prefabricated superposed cantilever beam 700 to the upper surface of the bottom plate of the first box-type connector 712; welding the lower longitudinal bar in the prefabricated superposed intermediate beam 701 to the upper surface of the bottom plate of the second box-type connector 713; welding a middle waist bar in the prefabricated superposed cantilever beam 700 to the upper surface of the top plate of the first box-type connector 712; welding a middle waist bar in the prefabricated superposed intermediate beam 701 to the upper surface of the top plate of the second box-type connector 713; adjusting the spacing of all the second integral closed stirrups 718 and binding all the second integral closed stirrups with the lower longitudinal bars and the middle waist bars of the prefabricated superposed cantilever beam 700 and of the prefabricated superposed intermediate beam 701, and thus completing the processing of pre-embedded steel members.

In some embodiments of the present invention, the notch is formed in the web of the T-shaped shear connector 704 and is located at an inflection point of the beam under vertical load of the frame beam.

In some embodiments of the present invention, the first steel plate 706 and the second steel plate 707 are rectangular in cross-section.

II. Factory Fabrication of Precast Concrete Members

As shown in FIG. 8-FIG. 14, further, the processed steel skeleton in step I is placed into the template. The concrete is poured in the template and conventional treatments are performed, such as maintenance, and so on. The buckling-restrained and energy-dissipating connecting plate 719 is mounted on the side faces of the first box-type connection member 712 and of second box-type connection member 713 by the split bolts 720, and thus the manufacture of the prefabricated superposed beam (the prefabricated superposed cantilever beam 700+the prefabricated superposed intermediate beam 701) is completed.

As shown in FIG. 8-FIG. 14, in some embodiments of the present invention, a first mechanical connecting sleeve 710 is completely screwed into the upper longitudinal bar 702 of the prefabricated superposed cantilever beam. A second mechanical connecting sleeve 711 is completely screwed into the upper longitudinal bar 703 of the prefabricated superposed intermediate beam.

Figure 7:
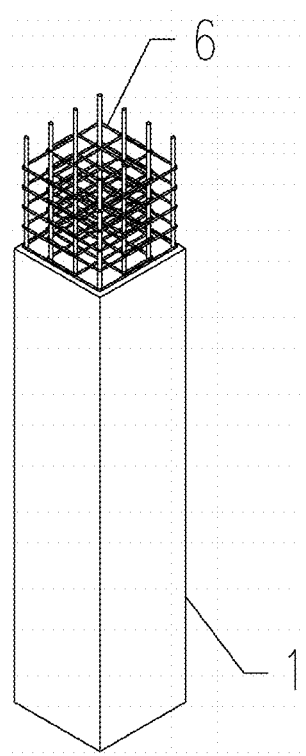
FIG. 7 is a structurally schematic view of a prefabricated solid column in a seismic resilient precast concrete frame structure according to an embodiment of the present invention.
Figure 8:
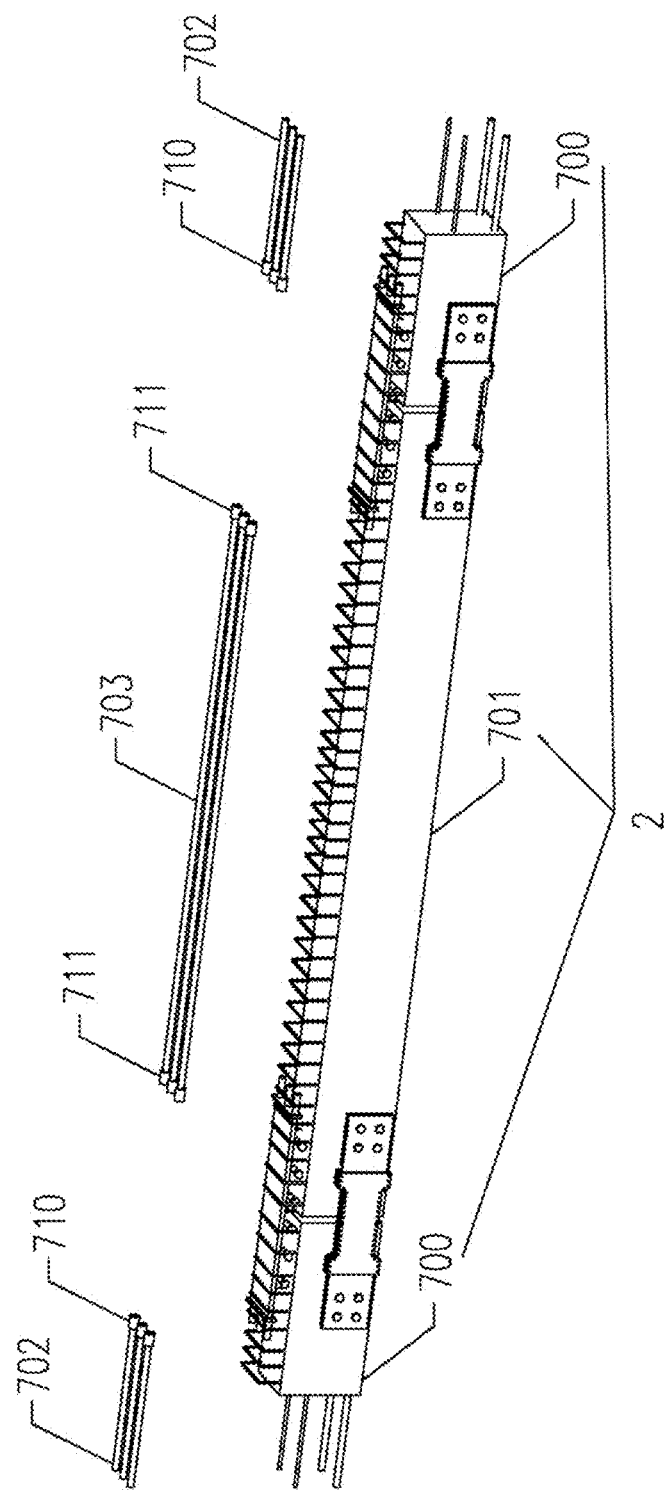
FIG. 8 is a structurally schematic view of a prefabricated superposed beam (a prefabricated superposed cantilever beam+a prefabricated superposed intermediate beam) in a seismic resilient precast concrete frame structure according to an embodiment of the present invention.
Figure 9:
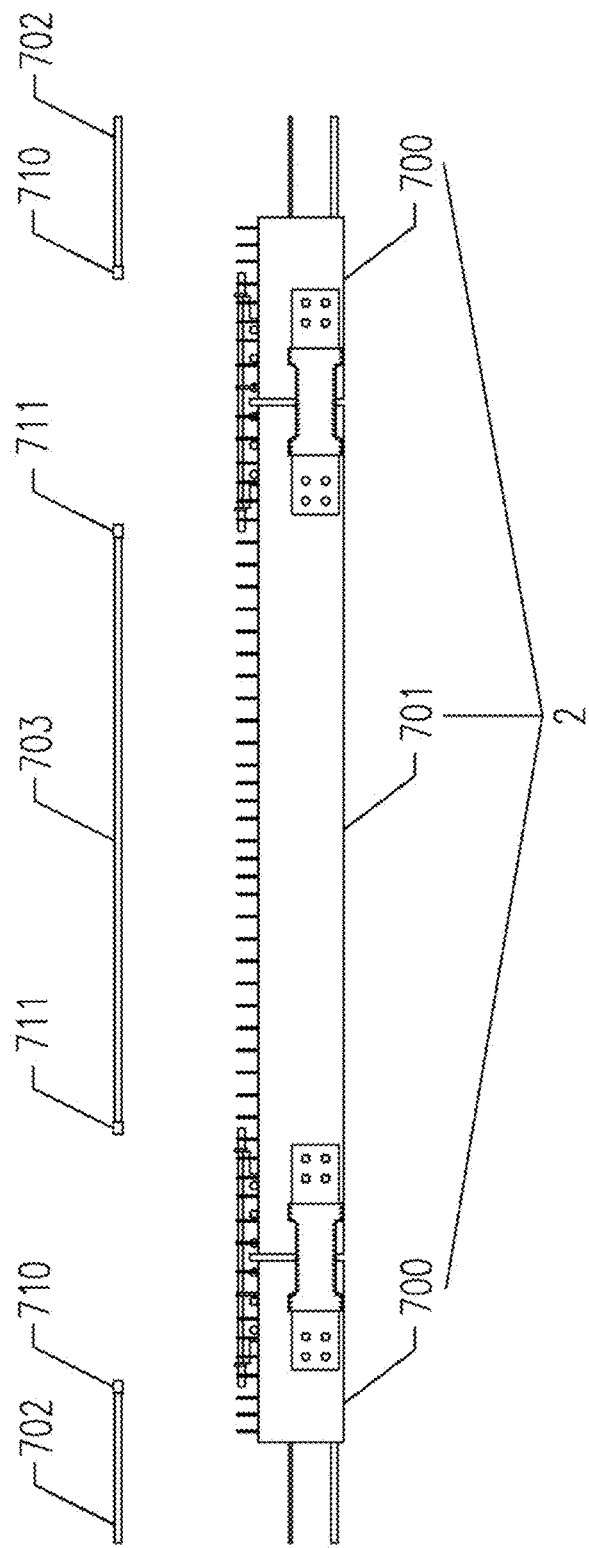
FIG. 9 is a front view of the prefabricated superposed beam (prefabricated superposed cantilever beam+prefabricated superposed intermediate beam) shown in FIG. 8.
Figure 10:
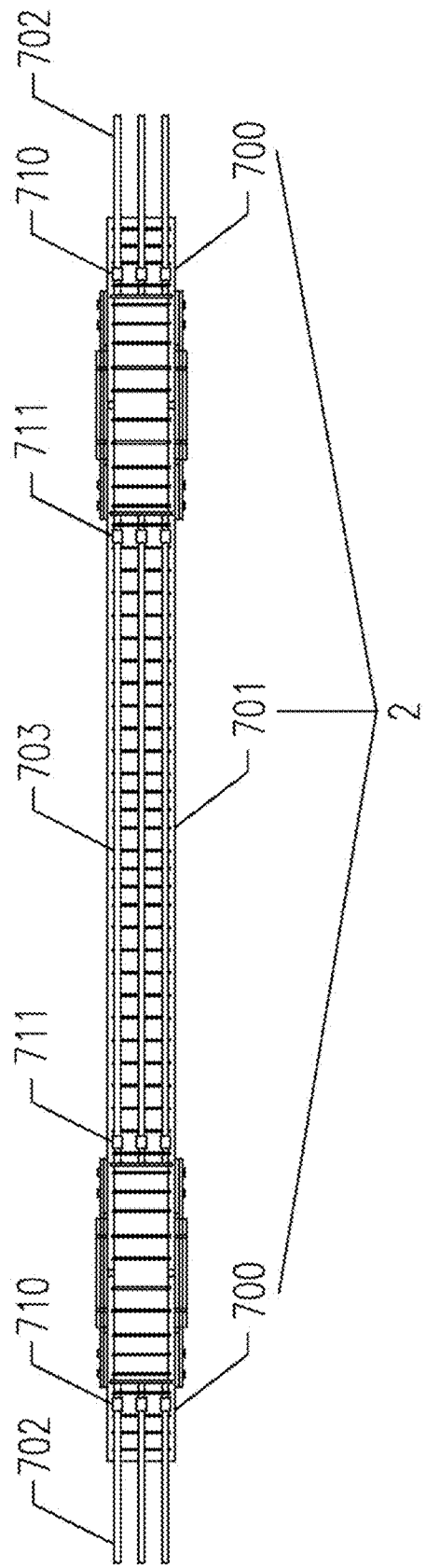
FIG. 10 is a top view of the prefabricated superposed beam (prefabricated superposed cantilever beam+prefabricated superposed intermediate beam) shown in FIG. 8.
Figure 11:
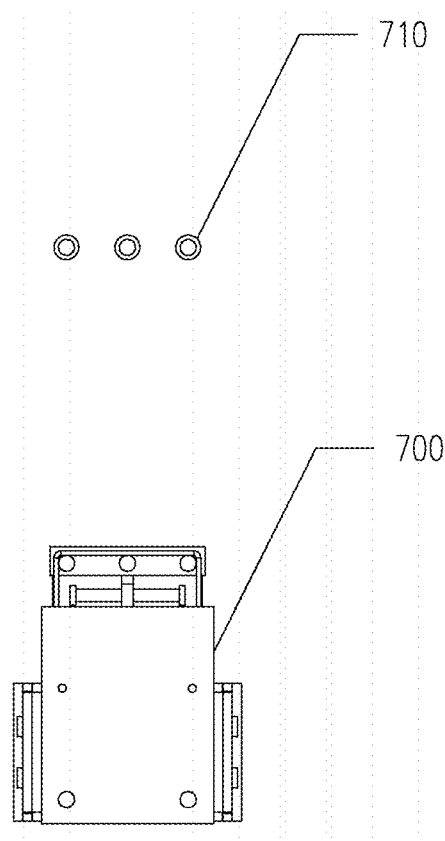
FIG. 11 is a side view of the prefabricated superposed beam (prefabricated superposed cantilever beam+prefabricated superposed intermediate beam) shown in FIG. 8.
Figure 12:
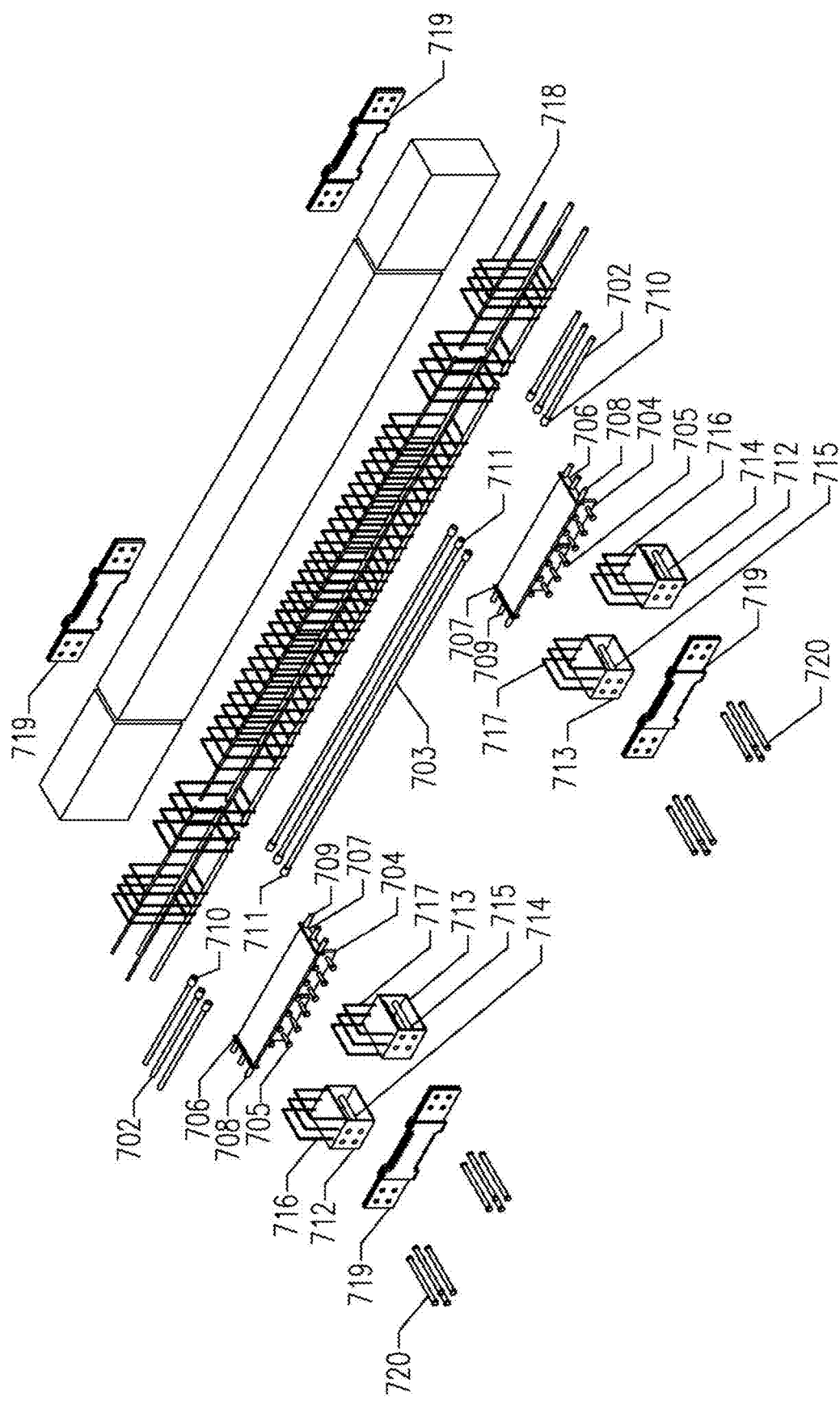
FIG. 12 is a schematic view showing the configuration of the prefabricated superposed beam (prefabricated superposed cantilever beam+prefabricated superposed intermediate beam) shown in FIG. 8.
Figure 13:
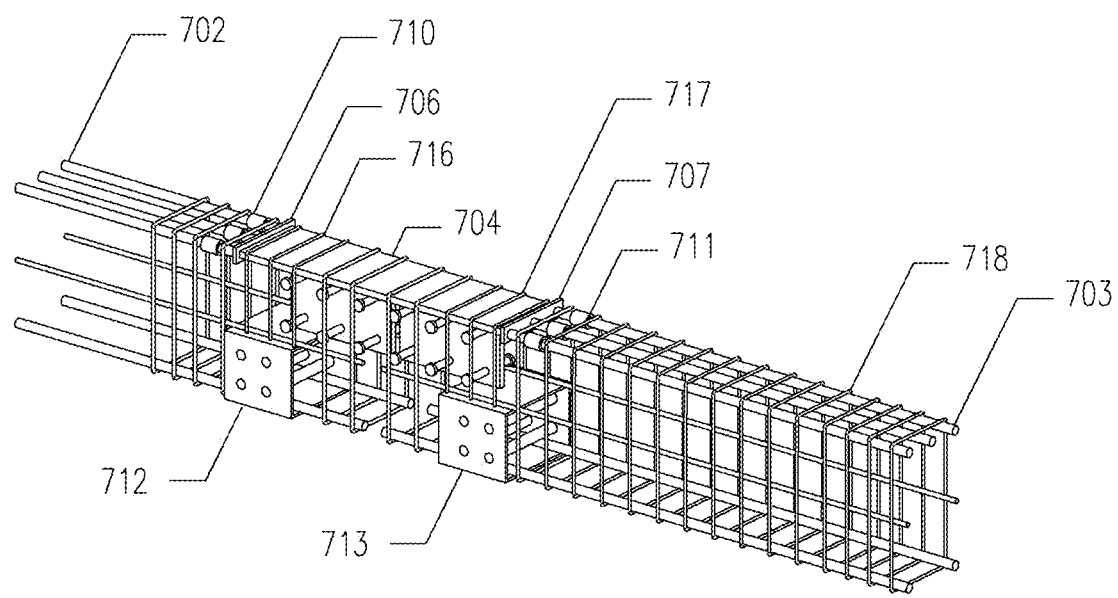
FIG. 13 is a perspective view of the prefabricated superposed beam (prefabricated superposed cantilever beam+prefabricated superposed intermediate beam) shown in FIG. 8.
Figure 14:
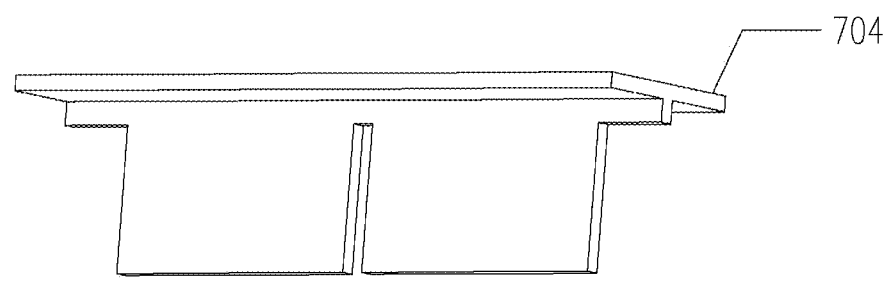
FIG. 14 is a structurally schematic view of a notched T-shaped shear connector in the prefabricated superposed beam (prefabricated superposed cantilever beam+prefabricated superposed intermediate beam) shown in FIG. 12.

As shown in FIG. 7, in some of the embodiments of the present invention, a prefabricated solid column is made, where the first layer of the prefabricated solid column is made of high-strength reinforcing bars HRB600.

Figure 15:
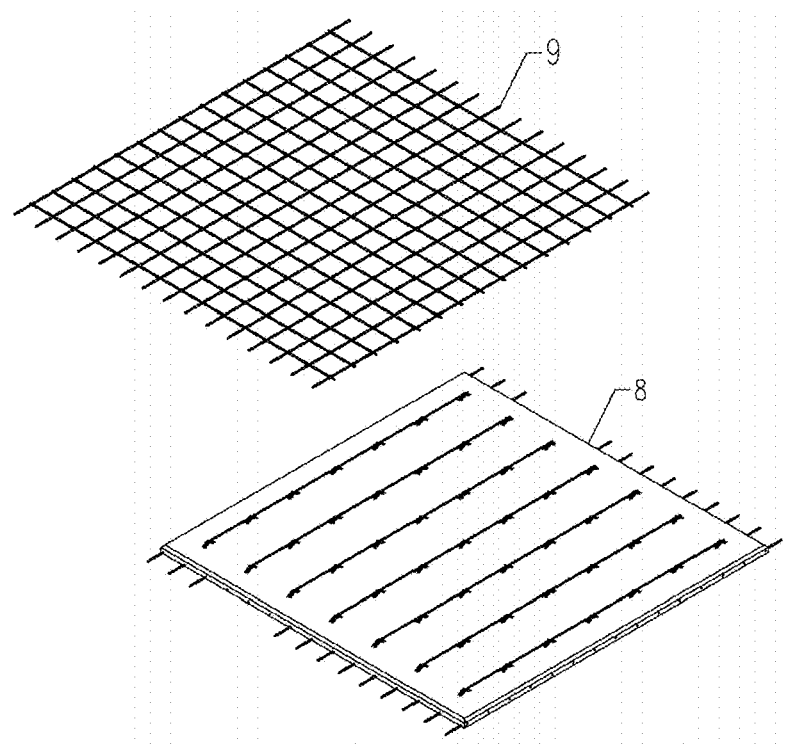
FIG. 15 is a structurally schematic view of a prefabricated superimposed slab with partial extending bar in a seismic resilient precast concrete frame structure according to an embodiment of the present invention.

As shown in FIG. 15, in some of the embodiments of the present invention, a prefabricated superposed slab with partial extending bar 8 and a steel mesh on the top of prefabricated superposed slab with partial extending bar 9 are made, where an overhanging plate bottom reinforcing bar is not provided at a local position of the prefabricated superposed slab with partial extending bar 8 corresponding to the notched T-shear connectors 704.

III. On-Site Installation of Precast Concrete Members

As shown in FIG. 7-FIG. 16, further, the prefabricated solid column 1 is hoisted to a painted positioning line. A beam bottom temporary support is provided, and the prefabricated superposed beam (a prefabricated superposed cantilever beam 700+a prefabricated superposed intermediate beam 701) is hoisted to the painted positioning line. A certain number of first integral closed stirrup 6 pass into an upper reserved longitudinal bar of the prefabricated solid column 1 and are connected to the prefabricated solid column by binding. A plate bottom temporary support is provided, and the prefabricated superposed slab with partial extending bar 8 is hoisted onto the painted positioning line. The first mechanical connecting sleeve 710 is reversely screwed into the first short reinforcing bar 708. The upper longitudinal bar 702 of the prefabricated superposed cantilever beam are bound with the second integral closed stirrup 718 of the prefabricated superposed cantilever beam 700. The second mechanical connecting sleeve 711 is reversely screwed into the second short reinforcing bar 709. The upper longitudinal bar 703 of the prefabricated superposed intermediate beam is bound with the second integral closed stirrup 718 of the prefabricated superposed intermediate beam 701. The steel mesh on the top of the prefabricated superposed slab with partial extending bar 9 is arranged, the end of the steel mesh on the top of the prefabricated superposed slab with partial extending bar 9 abuts against the upper surface of the flange of the notched T-shaped shear connector 704. A template of the superimposed cast-in-place layers is erected, and the concrete is poured in the template and conventional treatments are performed, such as maintenance and so on. The above steps are repeated, and the construction and installation of each layer are carried out successively from the bottom to the top, so as to finally realize a seismic resilient precast concrete frame structure with bearing, energy-dissipating and recovery multi-objective cooperation proposed by the present invention.

Figure 16:
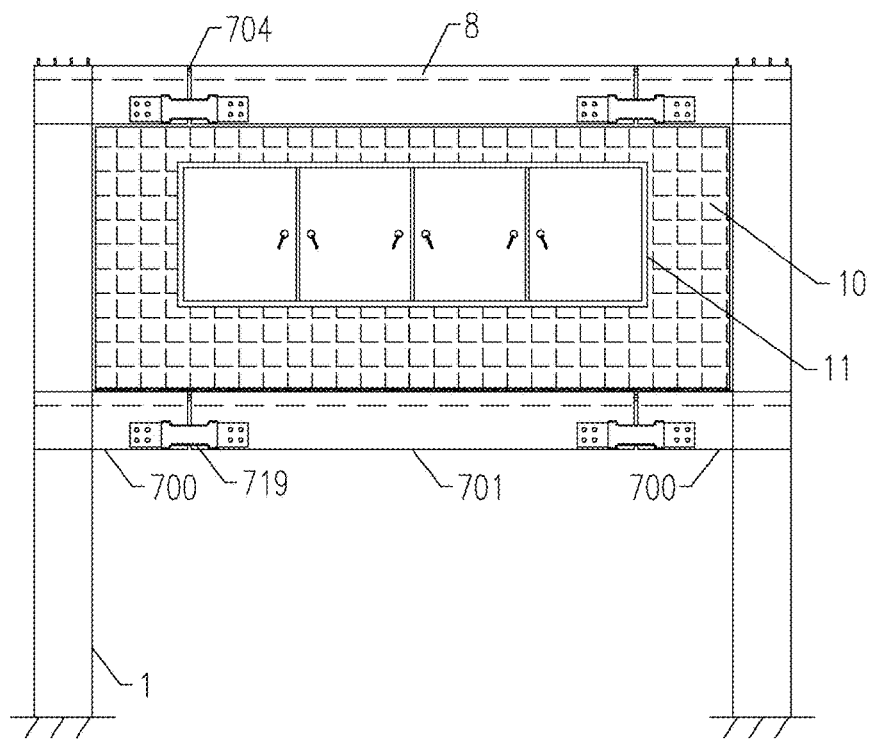
FIG. 16 is a view showing a practical engineering application of a seismic resilient precast concrete frame structure according to an embodiment of the present invention.

In some of the embodiments of the present invention, as shown in FIG. 16, further, a light panel wall 10 is installed on the prefabricated superposed slab with partial extending bar 8, and a window 11 is formed on the light panel wall 10. Among them, a certain gap is left between the light panel wall 10 and the prefabricated solid column 1 and between the light panel wall 10 the prefabricated superposed beam (the prefabricated superposed cantilever beam 700+the prefabricated superposed intermediate beam 701), so as to prevent the light panel wall 10 from colliding with the prefabricated solid column 1 and the prefabricated superposed beam (the prefabricated superposed cantilever beam 700+the prefabricated superposed intermediate beam 701) under an earthquake.

The working principle of the present invention is as follows. Under the vertical load, the notched T-shaped shear connector 704 undertakes the vertical shear force at the beam end and the bending moment at the beam end. During a small earthquake, the notched T-shaped shear connector 704 and the buckling-restrained and energy-dissipating connecting plate 719 jointly bear the beam-end bending moment generated by the horizontal earthquake, while the additional beam-end shear force generated by the horizontal earthquake is borne by the notched T-shaped shear connector 704. During a small earthquake, the buckling-restrained and energy-dissipating connecting plate 719 has entered into plasticity, which not only dissipates the seismic energy, but also increases the damping ratio of the frame structure under small earthquakes, thus reducing the mechanical response of the main structure. During medium or large earthquakes, due to the high-strength reinforcing bars used in the column foot of the frame column, the column foot area will always be maintained at the elastic state, the energy dissipation mechanism of the suspension rotation will be fully utilized, and the structural damage will be concentrated on the buckling-restrained and energy-dissipating connecting plate 719. However, in the post-earthquake repair stage, the prefabricated solid column 1, the prefabricated superposed beam (the prefabricated superposed cantilever beam 700+the prefabricated superposed intermediate beam 701) and the prefabricated superposed slab with partial extending bar 8 are all kept in an elastic state. The normal use function of the structure may be restored only by loosening the split bolt 720 and replacing the buckling-restrained and energy-dissipating connecting plate 719.

Finally, it should be stated that the present embodiment provides a seismic resilient precast concrete frame structure with bearing, energy-dissipating and recovery multi-objective cooperation and construction method therefor, the essence of which is to realize the suspension and rotation energy dissipating mechanism of the precast concrete frame structure, so as to solve the problems of the multi-objective cooperation difficulty of bearing, energy dissipating and recovery, significant floor effect and insufficient overall damage control of the structure. As a common energy-dissipating member, the buckling-restrained and energy-dissipating connecting plate 719 has a relatively clear working principle and detailed configuration, and thus it will not be described in detail.

The above-mentioned embodiments are only intended to illustrate the technical solution of the invention, but not to limit it. Although the invention has been described in detail with reference to the each foregoing embodiment, it should be understandable by those skilled in the art that the technical solutions of the each above-mentioned embodiment can still be modified, or some of the technical features thereof can be equivalently substituted. Such modifications and substitutions will not cause the essence of the corresponding technical solutions to depart from the scope of the embodiments of the invention.

What is claimed is:

1. A seismic resilient precast concrete frame structure, comprising a prefabricated solid column, a prefabricated superposed beam, a notched T-shaped shear connector and a buckling-restrained and energy-dissipating connecting plate; the prefabricated superposed beam is connected to the prefabricated solid column, and the prefabricated superposed beam comprises a prefabricated superposed intermediate beam and prefabricated superposed cantilever beams respectively disposed at both sides of the prefabricated superposed intermediate beam; tops of the prefabricated superposed cantilever beams and the prefabricated superposed intermediate beam are connected by the notched T-shaped shear connector; side faces of the prefabricated superposed cantilever beams and the prefabricated superposed intermediate beam are connected by the buckling-restrained and energy-dissipating connecting plate, wherein a length-width ratio of the notched T-shaped shear connector is less than the length-width ratio of the buckling-restrained and energy-dissipating connecting plate, and a notch in the notched T-shaped shear connector is located at a bending moment zero point under a vertical load of a frame structure.

2. The seismic resilient precast concrete frame structure according to claim 1, wherein each of the prefabricated superposed cantilever beams and the prefabricated superposed intermediate beam are completely disconnected with a horizontal gap reserved between each of the prefabricated superposed cantilever beams and the prefabricated superposed intermediate beam.

3. The seismic resilient precast concrete frame structure according to claim 2, wherein the seismic resilient precast concrete frame structure further comprises a prefabricated superimposed slab with partial extending bar, and a steel mesh on a top of prefabricated superimposed slab with partial extending bar; wherein the prefabricated superimposed slab with partial extending bar is mounted on the prefabricated superimposed cantilever beam and the prefabricated superimposed intermediate beam; and the steel mesh on the top of the prefabricated superimposed slab with partial extending bar is disposed on the prefabricated superimposed slab with partial extending bar, wherein an end of the steel mesh on the top of the prefabricated superimposed slab with partial extending bar abuts against an upper surface of a flange of the notched T-shaped shear connector.

4. The seismic resilient precast concrete frame structure according to claim 1, wherein the seismic resilient precast concrete frame structure further comprises a shear stud, a first steel plate, a second steel plate, a first short reinforcing bar and a second short reinforcing bar; the shear stud is welded to a web of the notched T-shaped shear connector; the first steel plate is welded to a flange edge of a cantilever section side of the notched T-shaped shear connector; the second steel plate is welded to a flange edge of a middle section side of the notched T-shaped shear connector; the first short reinforcing bar is welded to a surface of the first steel plate; and the second short reinforcing bar is welded to a surface of the second steel plate.

5. The seismic resilient precast concrete frame structure according to claim 4, wherein the seismic resilient precast concrete frame structure further comprises a prefabricated superimposed slab with partial extending bar, and a steel mesh on a top of prefabricated superimposed slab with partial extending bar; wherein the prefabricated superimposed slab with partial extending bar is mounted on the prefabricated superimposed cantilever beam and the prefabricated superimposed intermediate beam; and the steel mesh on the top of the prefabricated superimposed slab with partial extending bar is disposed on the prefabricated superimposed slab with partial extending bar, wherein an end of the steel mesh on the top of the prefabricated superimposed slab with partial extending bar abuts against an upper surface of a flange of the notched T-shaped shear connector.

6. The seismic resilient precast concrete frame structure according to claim 1, wherein the seismic resilient precast concrete frame structure further comprises a first box-type connector, a second box-type connector, a first thin-walled circular steel pipe, a second thin-walled circular steel pipe, a first U-shaped stirrup, a second U-shaped stirrup and a second integral closed stirrup; the first thin-walled circular steel pipe is welded to the first box-type connector; the second thin-walled circular steel pipe is welded to the second box-type connector; the first U-shaped stirrup is welded to an upper surface of a top plate of the first box-type connector; the second U-shaped stirrup is welded to an upper surface of a top plate of the second box-type connector; a lower longitudinal bar in each of the prefabricated superposed cantilever beams is welded to a upper surface of a bottom plate of the first box-type connector; a lower longitudinal bar in the prefabricated superposed intermediate beam is welded to a upper surface of a bottom plate of the second box-type connector; a middle waist bar in each of the prefabricated superposed cantilever beams is welded to the upper surface of the top plate of the first box-type connector; a middle waist bar in the prefabricated superposed intermediate beam is welded to the upper surface of the top plate of the second box-type connector; and the second integral closed stirrup is bound with the lower longitudinal bars and the middle waist bars in each of the prefabricated superposed cantilever beams and in the prefabricated superposed intermediate beam.

7. The seismic resilient precast concrete frame structure according to claim 6, wherein a bottom surface of a web of the notched T-shaped shear connector is welded to the upper surfaces of the top plates of the first box-type connector and the second box-type connector.

8. The seismic resilient precast concrete frame structure according to claim 7, wherein the seismic resilient precast concrete frame structure further comprises a prefabricated superimposed slab with partial extending bar, and a steel mesh on a top of prefabricated superimposed slab with partial extending bar; wherein the prefabricated superimposed slab with partial extending bar is mounted on the prefabricated superimposed cantilever beam and the prefabricated superimposed intermediate beam; and the steel mesh on the top of the prefabricated superimposed slab with partial extending bar is disposed on the prefabricated superimposed slab with partial extending bar, wherein an end of the steel mesh on the top of the prefabricated superimposed slab with partial extending bar abuts against an upper surface of a flange of the notched T-shaped shear connector.

9. The seismic resilient precast concrete frame structure according to claim 6, wherein the seismic resilient precast concrete frame structure further comprises an upper longitudinal bar of each of the prefabricated superposed cantilever beams, an upper longitudinal bar of the prefabricated superposed intermediate beam, a first mechanical connecting sleeve and a second mechanical connecting sleeve; the first mechanical connecting sleeve is completely screwed into the upper longitudinal bar of each of the prefabricated superposed cantilever beams; the second mechanical connecting sleeve is completely screwed into the upper longitudinal bar of the prefabricated superposed intermediate beam; the first mechanical connecting sleeve and the second mechanical connecting sleeve are reversely screwed into the first short reinforcing bar and the second short reinforcing bar, respectively; and the second integral closed stirrup is respectively bound with the upper longitudinal bar of each of the prefabricated superposed cantilever beams and the upper longitudinal bar of the prefabricated superposed intermediate beam.

10. The seismic resilient precast concrete frame structure according to claim 9, wherein the seismic resilient precast concrete frame structure further comprises a prefabricated superimposed slab with partial extending bar, and a steel mesh on a top of prefabricated superimposed slab with partial extending bar; wherein the prefabricated superimposed slab with partial extending bar is mounted on the prefabricated superimposed cantilever beam and the prefabricated superimposed intermediate beam; and the steel mesh on the top of the prefabricated superimposed slab with partial extending bar is disposed on the prefabricated superimposed slab with partial extending bar, wherein an end of the steel mesh on the top of the prefabricated superimposed slab with partial extending bar abuts against an upper surface of a flange of the notched T-shaped shear connector.

11. The seismic resilient precast concrete frame structure according to claim 6, wherein the seismic resilient precast concrete frame structure further comprises split bolts; and the buckling-restrained and energy-dissipating connecting plate is bolted to side faces of the first box-type connector and the second box-type connector by the split bolts.

12. The seismic resilient precast concrete frame structure according to claim 11, wherein the seismic resilient precast concrete frame structure further comprises a prefabricated superimposed slab with partial extending bar, and a steel mesh on a top of prefabricated superimposed slab with partial extending bar; wherein the prefabricated superimposed slab with partial extending bar is mounted on the prefabricated superimposed cantilever beam and the prefabricated superimposed intermediate beam; and the steel mesh on the top of the prefabricated superimposed slab with partial extending bar is disposed on the prefabricated superimposed slab with partial extending bar, wherein an end of the steel mesh on the top of the prefabricated superimposed slab with partial extending bar abuts against an upper surface of a flange of the notched T-shaped shear connector.

13. The seismic resilient precast concrete frame structure according to claim 6, wherein the seismic resilient precast concrete frame structure further comprises a prefabricated superimposed slab with partial extending bar, and a steel mesh on a top of prefabricated superimposed slab with partial extending bar; wherein the prefabricated superimposed slab with partial extending bar is mounted on the prefabricated superimposed cantilever beam and the prefabricated superimposed intermediate beam; and the steel mesh on the top of the prefabricated superimposed slab with partial extending bar is disposed on the prefabricated superimposed slab with partial extending bar, wherein an end of the steel mesh on the top of the prefabricated superimposed slab with partial extending bar abuts against an upper surface of a flange of the notched T-shaped shear connector.

14. The seismic resilient precast concrete frame structure according to claim 1, wherein the notch in the notched T-shear connector is formed in a web of the T-shear connector.

15. The seismic resilient precast concrete frame structure according to claim 14, wherein the seismic resilient precast concrete frame structure further comprises a prefabricated superimposed slab with partial extending bar, and a steel mesh on a top of prefabricated superimposed slab with partial extending bar; wherein the prefabricated superimposed slab with partial extending bar is mounted on the prefabricated superimposed cantilever beam and the prefabricated superimposed intermediate beam; and the steel mesh on the top of the prefabricated superimposed slab with partial extending bar is disposed on the prefabricated superimposed slab with partial extending bar, wherein an end of the steel mesh on the top of the prefabricated superimposed slab with partial extending bar abuts against an upper surface of a flange of the notched T-shaped shear connector.

16. The seismic resilient precast concrete frame structure according to claim 1, wherein the seismic resilient precast concrete frame structure further comprises a prefabricated superimposed slab with partial extending bar, and a steel mesh on a top of prefabricated superimposed slab with partial extending bar; wherein the prefabricated superimposed slab with partial extending bar is mounted on the prefabricated superimposed cantilever beam and the prefabricated superimposed intermediate beam; and the steel mesh on the top of the prefabricated superimposed slab with partial extending bar is disposed on the prefabricated superimposed slab with partial extending bar, wherein an end of the steel mesh on the top of the prefabricated superimposed slab with partial extending bar abuts against an upper surface of a flange of the notched T-shaped shear connector.

17. A construction method for the seismic resilient precast concrete frame structure according to claim 1, the construction method comprising steps of:
    factory processing of steel skeletons including:
        welding a shear stud to the web of a notched T-shaped shear connector;
        welding a first steel plate to a flange edge of a cantilever section side of the notched T-shaped shear connector; welding a second steel plate to a flange edge of a middle section side of the notched T-shaped shear connector;
        welding a first short reinforcing bar to a surface of the first steel plate; welding a second short reinforcing bar to a surface of the second steel plate;
        welding a first thin-walled circular steel pipe into a first box-type connector; welding a second thin-walled circular steel pipe into a second box-type connector;

passing a second integral closed stirrup into the notched T-shaped shear connector;

welding a bottom surface of the web of the notched T-shaped shear connector to upper surfaces of top plates of the first box-type connector and the second box-type connector;

welding a first U-shaped stirrup to the upper surface of the top plate of the first box-type connector; welding a second U-shaped stirrup to the upper surface of the top plate of the second box-type connector;

passing the second integral closed stirrup into a lower longitudinal bar in each of the prefabricated superposed cantilever beams; passing the second integral closed stirrup into a lower longitudinal bar in the prefabricated superposed intermediate beam;

welding the lower longitudinal bar in each of the prefabricated superposed cantilever beams to the upper surface of the bottom plate of the first box-type connector; welding the lower longitudinal bar in the prefabricated superposed intermediate beam to the upper surface of the bottom plate of the second box-type connector;

welding a middle waist bar in each of the prefabricated superposed cantilever beams to the upper surface of the top plate of the first box-type connector; welding a middle waist bar in the prefabricated superposed intermediate beam to the upper surface of the top plate of the second box-type connector; and adjusting a spacing of all the second integral closed stirrups and binding all the second integral closed stirrups with the lower longitudinal bars and the middle waist bars of each of the prefabricated superposed cantilever beams and of the prefabricated superposed intermediate beam, and thus completing processing of pre-embedded steel members;

factory fabrication of precast concrete members including:

erecting a template, and accurately placing the processed steel skeletons in the step of factory processing into the template;

pouring concrete in the template;

mounting the buckling-restrained and energy-dissipating connecting plate on side faces of the first box-type connector and the second box-type connector by split bolts, and thus completing fabrication of the prefabricated superposed beam;

completely screwing a first mechanical connecting sleeve into an upper longitudinal bar of each of the prefabricated superposed cantilever beams; screwing a second mechanical connecting sleeve completely into an upper longitudinal bar of the prefabricated superposed intermediate beam;

making the prefabricated solid column, wherein a first layer of the prefabricated solid column is made of high-strength reinforcing bars; and making a prefabricated superimposed slab with partial extending bar and a steel mesh on a top of prefabricated superimposed slab with partial extending bar, wherein an overhanging plate bottom reinforcing bar is not provided at a local position corresponding to the notched T-shaped shear connector;

on-site installation of precast concrete members including:

hoisting the prefabricated solid column to a painted positioning line;

providing a beam bottom temporary support, and hoisting the prefabricated superposed beam to the painted positioning line;

passing a first integral closed stirrup into an upper reserved longitudinal bar of the prefabricated solid column, and connecting first integral closed stirrup to the prefabricated solid column by binding;

providing a plate bottom temporary support, and hoisting the prefabricated superimposed slab with partial extending bar to the painted positioning line;

reversely screwing the first mechanical connecting sleeve into the first short reinforcing bar; binding the upper longitudinal bar of each of the prefabricated superposed cantilever beams with the second integral closed stirrup of each of the prefabricated superposed cantilever beams;

reversely screwing the second mechanical connecting sleeve into the second short reinforcing bar; binding the upper longitudinal bar of the prefabricated superposed intermediate beam with the second integral closed stirrup of the prefabricated superposed intermediate beam;

arranging the steel mesh on the top of the prefabricated superimposed slab with partial extending bar, the end of the steel mesh on the top of the prefabricated superimposed slab with partial extending bar abuts against the upper surface of the flange of the notched T-shaped shear connector;

erecting a template of the superimposed cast-in-place layers, and pouring concrete in the template; and repeating the steps of on-site installation of precast concrete members, successively performing construction and installation of each layer from the bottom to the top, and completing construction of the seismic resilient precast concrete frame structure.

* * * * *